(12) United States Patent
Brown et al.

(10) Patent No.: US 10,048,068 B2
(45) Date of Patent: Aug. 14, 2018

(54) INTEGRATING POINT CLOUD SCANS, IMAGE DATA, AND TOTAL STATION DATA FROM A SURVEYING INSTRUMENT INTO ONE ADJUSTMENT

(71) Applicant: TRIMBLE NAVIGATION LIMITED, Sunnyvale, CA (US)

(72) Inventors: Troy Brown, Westminster, CO (US); Arnaud Boucherat, Westminster, CO (US); Thomas G. Chaperon, Nogent-sur-Marne (FR)

(73) Assignee: TRIMBLE INC., Sunnyvale, CA (US)

( * ) Notice: Subject to any disclaimer, the term of this patent is extended or adjusted under 35 U.S.C. 154(b) by 263 days.

(21) Appl. No.: 15/194,699

(22) Filed: Jun. 28, 2016

(65) Prior Publication Data

US 2017/0372488 A1 Dec. 28, 2017

(51) Int. Cl.
*G01C 1/04* (2006.01)
*G06T 7/50* (2017.01)
*G06T 7/593* (2017.01)
*G01S 7/481* (2006.01)
*G01S 17/89* (2006.01)

(52) U.S. Cl.
CPC .............. *G01C 1/04* (2013.01); *G01S 7/4817* (2013.01); *G01S 17/89* (2013.01); *G06T 7/50* (2017.01); *G06T 7/593* (2017.01); *G06T 2207/10028* (2013.01); *G06T 2207/30181* (2013.01); *G06T 2207/30244* (2013.01)

(58) Field of Classification Search
CPC .......... G01C 15/002; G01C 1/02; G01C 1/04; G01S 17/89; G01S 17/023
See application file for complete search history.

(56) References Cited

U.S. PATENT DOCUMENTS

| | | | |
|---|---|---|---|
| 2015/0042977 A1* | 2/2015 | Siercks | G01C 15/002 356/4.01 |
| 2015/0085105 A1 | 3/2015 | Maynard | |
| 2016/0187130 A1* | 6/2016 | Metzler | G01C 1/04 382/109 |

OTHER PUBLICATIONS

Rusinkiewicz, "Rigid Body Alignment", Princeton University, 2005.*

(Continued)

*Primary Examiner* — Vincent Rudolph
*Assistant Examiner* — Raphael Schwartz
(74) *Attorney, Agent, or Firm* — Marsh Fischmann & Breyfogle LLP; Kent A. Lembke

(57) ABSTRACT

A method to integrate all observations, e.g., surveying data in the form of total station data, images, and point clouds) from a surveying instrument that functions as a total station, a camera(s), and a scanner. The method provides an overall adjustment to maximize the accuracy of the adjustment by using all three types of available surveying data, and the method may be labeled an overall adjustment or integrated network adjustment to provide accurate station or instrument position data for a geodatabase for a surveyed site. The overall adjustment method allows all three types of surveying data to influence the results of the adjustment, and this achieved by generating a small number of virtual observations from the image and scan data that are of a form that allows them to be combined with or considered concurrently with the real observations from the total station as part of a single network adjustment.

36 Claims, 6 Drawing Sheets

(56) References Cited

OTHER PUBLICATIONS

Kim, et al, "Evaluation of 3D Feature Descriptors for Multi-Modal Data Registration," 2013 International Conference on 3D Vision, IEEE, Jun. 29, 2013.

International Search Report for International Application No. PCT/US2017/039258, dated Oct. 4, 2017.

\* cited by examiner

INTEGRATING POINT CLOUD SCANS, IMAGE DATA, AND TOTAL STATION DATA FROM A SURVEYING INSTRUMENT INTO ONE ADJUSTMENT

BACKGROUND

1. Field of the Invention

The present invention generally relates to surveying and surveying instruments and, more particularly, to a method and corresponding system for integrating all observations from a single surveying instrument, i.e., images, total stations, and point clouds, into one overall adjustment to maximize or improve accuracy.

2. Relevant Background

Traditional surveying may involve operators working with a theodolite and range pole. One operator generally positions the theodolite over a known point while the other operator holds the range pole at a series of points whose locations are to be determined. A target mounted on the range pole is sighted through the theodolite and accurate angular measurements are obtained. Modern surveyors typically use an instrument called a total station, which can be thought of as a theodolite with a built-in laser range finder. Such an instrument is more convenient because distances can be measured directly instead of requiring triangulation techniques or a measuring tape. Surveying with total stations is usually most optimal when the range pole is equipped with a prism to reflect the light from the laser range finder back to the total station. This helps to avoid accidentally measuring to unintentional objects.

In modern satellite-based surveying, an operator may move about with a survey instrument that also determines position information using a global navigation satellite system (GNSS). This is typically a GNSS receiver, which may be referred to as the rover. The satellite positioning system most commonly used today is the global positioning system (GPS), although others such as the global orbiting navigation system (GLONASS) are in use or under development. The operator generally moves about a site and stops at various points to record location information determined using signals transmitted by satellite sources to a receiver on the portable survey instrument. Location information is automatically calculated using a differential technique that requires a second GNSS receiver known as the base station to be located at a known position. It collects satellite signals at the same time as the rover. Satellite signals common to both receivers are used to compute a difference or delta vector. When this delta vector is added to the known position of the base station, the rover position is known to a much higher accuracy than a single receiver could accomplish. This can be done in real-time (real-time kinematic (RTK)) or in a post-processing step if more accuracy is needed.

Many surveying instruments may also include one or more cameras to provide photogrammetry-based surveying while an operator may move about a site with the surveying instrument. For location information, it may be coupled with a GNSS rover receiver or a prism for a total station to measure. One advantage of photogrammetry-based surveying is that it is capable of capturing large amounts of data in a short time, but a disadvantage is that it requires more effort to process the captured data. The survey instrument may also include tilt sensors that provide information on rotation of the survey instrument (i.e., X and Y rotation) at the time the photographs are gathered by the operator. A compass can also be included in the survey instrument to provide additional instrument orientation information. Multiple cameras are often used with modern survey instruments to increase the amount of image information or photographs captured for a surveyed site. For example, some survey instruments includes a set of cameras (e.g., 7 to 12 cameras or the like) that are used to capture 360-degree digital panoramic images for efficient visual documentation and measurement of the surrounding environment near the survey instrument (e.g., to capture a continuous view about the survey instrument).

The combined information can be used with known photogrammetry techniques to determine 3D coordinates of points. Such techniques often use two or more overlapping or adjacent panoramic images taken from different stations (e.g., different locations). The location and image information can be processed at the site using a controller or may be processed at an office remote from the site using a computer system (e.g., a central server processing the data to create a geodatabase or database populated with geospatial documentation). The image information in the geodatabase can be exported for additional analysis (e.g., to modeling software) and allows for additional measurements to be obtained at any time as long as the additional points or objects are visible in the images.

The surveying instrument, in addition to a total station and cameras, may further be configured to provide scanning with a 3D laser scanner for the rapid collection of 3D data or "a point cloud." This data can be captured quickly with immense detail and accuracy at each location where the surveying instrument is positioned. As with the total station data and images, the point cloud or scanned data can be transmitted or provided to the central server for processing to provide more detail and information in the geodatabase for a site. Hereinafter, the term "surveying instrument" shall generally refer to this type of instrument that functions as a total station, a scanner(s), and a camera(s).

While modern surveying instruments are very accurate (e.g., the total station data includes accurate measurements of vertical and horizontal angles and slope distance), a basic assumption of surveying is that no measurement is perfect, and there will always be at least a small amount of error. Surveyors may try to avoid errors by performing regular checks on their equipment and using consistent surveying methods. For example, a consistent and well-known technique of performing a traverse may be used to gather data at a site, which includes backsighting to get orientation (known-to-known locations) and foresighting to get a location of an unknown next surveying point for the surveying instrument. The surveyor "traverses" (e.g., a perimeter or partial perimeter about a target) a site step-by-step through the "unknown" points (using previously surveyed points as a base for observing the next point) gathering total station, point cloud, and image data at each point on the traverse. This can lead to an accumulated error as the surveyor performs the traverse (e.g., can lead to position misclosure and/or angular misclosure).

Once all the surveying data is collected (e.g., by performing the traverse at a site), the data is adjusted. For example, a surveyor may perform a traverse adjustment (e.g., with pencil and paper) or a more accurate adjustment may be performed (e.g., at the central server) involving least squares adjustment (or using the principle of least squares method) to provide more accuracy in the adjustment. A typical goal in performing the adjustment is to distribute or spread the error over all surveying points or locations (or between all the measurements).

A typical surveying software package may include software/programs to perform network adjustments (e.g., at a central server) that apply a least squares algorithm and also factor in refraction effects and the Earth's curvature to distribute the error during the adjustment. These can be very sophisticated calculations and, hence, are computationally expensive. As a result, many surveyors and adjustment software provided with surveying instruments only perform the network adjustment on the total station data.

SUMMARY

The inventors recognized that by limiting adjustment of collected surveying data to adjustments on total station data that a significant amount of available data was being ignored as the point cloud and image data can also be used to obtain a position (e.g., of a surveying instrument operated to traverse a site and/or surveying target). With this recognition in mind, the inventors created a method to integrate all observations (e.g., surveying data in the form of total station data, images (or image data), and point clouds (or point cloud data)) from a surveying instrument that functions as a total station, a scanner, and a camera. The method provides an overall adjustment to maximize the accuracy of the adjustment by using all three types of available surveying data, and the method may be labeled an overall adjustment (or combined-data type adjustment or grand network adjustment), which typically is performed by a central server as part of generating or maintaining a geodatabase.

To provide an overall adjustment method, though, the question of how to use all three types of data needs to be answered. The overall adjustment method preferably accounts for problems with the Earth's curvature and light refraction, which can be computationally expensive. For example, the scanner data (or the point cloud) includes billions of points such that it is impractical to apply all corrections to all of these points (e.g., during an adjustment process often called "registration"). Similar issues exist for processing photographs/images from the instrument's camera(s), and the calculation processes differ (e.g., during a bundle adjustment). Further, the inventors understood that optimization is generally specific to each type of surveying data and will only work for a particular type of adjustment. With these issues in mind, the overall adjustment method described herein allows all three types of surveying data to influence the results of the adjustment within one network adjustment (e.g., as part of a least squares adjustment), and this is achieved in part through processes of calculating proper weighting for the differing data as it was understood that one of the more important aspects of performing a least squares adjustment is to accurately determine weights of values or data.

More particularly, a method is provided for performing an integrated adjustment of data collected by a surveying instrument operable to gather differing data types. The method may be performed at a central server or data analysis server or similar computing device through the execution or running of code or programming. The method involves storing in memory (or one or more data storage devices) a set of total station observations for a physical site, image data for the site, and scan data for the site. Then, with a processor, the method involves executing code of an overall adjustment program to: (a) retrieve the total station observations, the image data, and the scan data; (b) perform a bundle adjustment of the image data; (c) after the bundle adjustment, generate a set of virtual observations from the image data; (d) perform a registration adjustment of the scan data; (e) after the registration adjustment, generate a set of virtual observations from the scan data; and (f) perform a single network adjustment on the total station observations, the virtual observations from the image data, and the virtual observations from the scan data. As output, the single network adjustment provides positions of the surveying instrument based on the set of total station observations, the image data, and scan data (rather than only on the total station observations). This adjustment accounts for Earth curvature effects for all three data types.

The overall adjustment program assigns, prior to the performing of the single network adjustment, weighting to the virtual observations from the image data and to the virtual observations from the image data from the scan data. The weighting is based on a total number of observations in the image data and the scan data, respectively. The number of virtual observations generated based on the image data and on the scan data typically is kept relatively small, with the weighting on each virtual observation taking into account the amount of data represented by each of these virtual observations. For example, the number of virtual observations in each set may be less than 10 observations and/or more than 4 observations (e.g., 5 to 9 virtual observations may be useful in many applications with 6 virtual observations being used by the inventors in some exemplary implementations). Weighting is, therefore, a function of the ratio of the number of real observations to the number of virtual observations.

The bundle adjustment includes using the image data to compute a six-dimensional (6D) pose and a covariance matrix at each station of the surveying instrument used to collect the image data, and the registration adjustment includes using the scan data to compute a six-dimensional (6D) pose and a covariance matrix at each station of the surveying instrument used to collect the scan data. Note, a 6D pose is a shorthand notation for the three position and three rotation parameters that describe the position and orientation of an object in 3D space. At this time, it is educational to discuss what a virtual observation is compared to a real observation. A real observation is an actual physical measurement such as observing the horizontal and vertical angle readings of the angle transducers in a total station when the telescope is aimed at a particular object or point. A real observation often also includes the slope distance reading of the electronic distance meter (EDM) at the same time. In this example, a real observation includes two angle measurements and one slope distance measurement that were done at the same time.

An important characteristic of a measurement is an estimate of its accuracy, which can be expressed as a standard error (sigma) or as a variance (sigma squared); therefore, a real observation not only contains the three measurement values but also error estimates of the values. For an observation made up of two or more correlated measurements such as these, it is customary to use a matrix that contains the variance values on the diagonal and covariance values in the off-diagonal elements. This matrix is commonly called the covariance matrix. When the 6D pose and 6×6 covariance matrix of an instrument are known, there is enough information to use the 3D measurement and the 3×3 covariance matrix of a real observation of a point to compute the 3D position of that point and to make error estimates of its position.

The reverse can also be accomplished. When the 6D pose and 6×6 covariance matrix of an instrument are known and the 3D position and 3×3 covariance matrix of a point are also known, there is enough information to compute the 3D measurements (e.g., two angles and one slope distance) of an observation to that point including the 3×3 covariance matrix of the observation. This observation is referred to as a virtual observation. When the point observed by the virtual observation is artificially chosen, it is referred to as a virtual point. Virtual and real observations appear to be identical in all ways. Both have correlated measurements and error estimates. The only difference is how their values and error estimates are determined.

In this method, virtual observations from image data may be angles-only (2D) observations while virtual observations from the scan data may be angles and distance (3D) observations. For the sake of brevity, it can be assumed that observations are always accompanied by covariance matrices for error estimation even when not explicitly stated. This means that computing or generating a virtual observation also means determining its covariance matrix. The observations explained above are indirect in nature because they represent a change in position relative to the instrument. There are also direct observations of which the 6D pose of the instrument is an example.

Generating virtual observations requires having known points. The geometry of pre-existing known points can be poor, which implies that better virtual observations can be obtained by artificially choosing some new points to have good geometry. These are the virtual points mentioned earlier in this summary. In some cases, the virtual observations are generated by computing a centroid of stations for the surveying instrument, positioning a sphere relative to the centroid, and choosing a set of virtual points on the surface of the sphere. In such cases, the set of virtual points is selected to maximize a minimum distance from each of the points to one of the stations.

DETAILED DESCRIPTION

Figure 1:
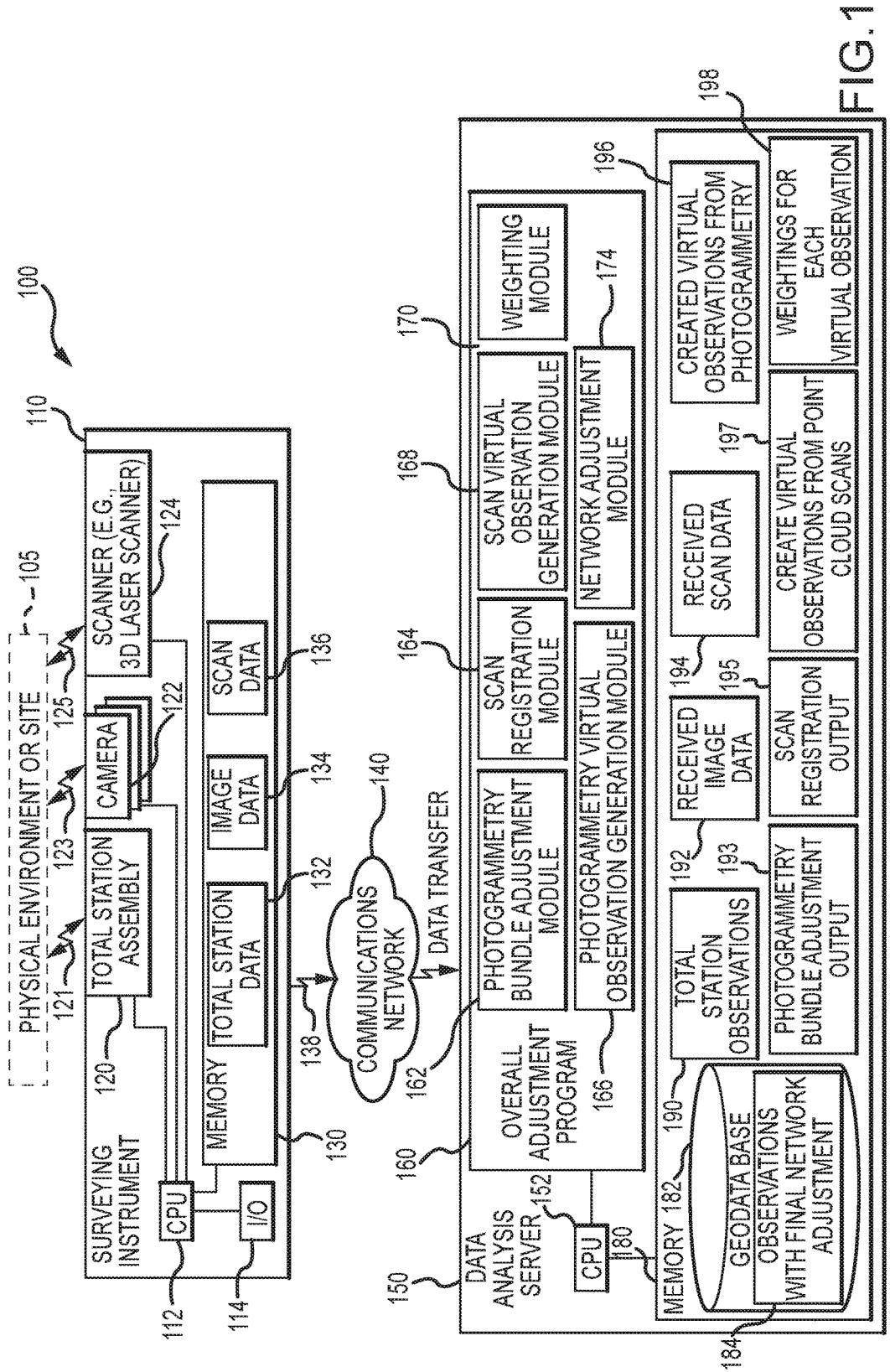
FIG. 1 illustrates with a functional block or schematic drawing a system for implementing the overall compensation method of the present description for data obtained by a surveying instrument functional as a total station as well as for collecting scan data (e.g., a point cloud) and image data (e.g., one or more cameras gathering digital images of a site or physical environment)

An overall adjustment method is described for use in adjusting, with a single adjustment process, surveying data collected from a surveying instrument that is configured to function as a total station as well as to collect scan (point cloud) data and image data such as with one or more 3D laser scanners and one or more cameras. In brief, all observations from the surveying instrument are integrated by the overall adjustment method into one "grand" adjustment so as to utilize all gathered data to maximize (or at least increase) accuracy of the adjustment.

An observation is one or more real, correlated measurements (e.g., measured by the survey instrument) while virtual observations look the same but are synthetically generated, usually by the computer program/code providing the overall adjustment method. For total stations and scanners, real measurements are supplied by some device like an angle transducer and/or electronic distance meter. For photogrammetry, real measurements are supplied by identifying row and column coordinates on an image supplied by a camera.

The inventors recognized that the best adjustment strategy is to use all observations from all data types in a weighted manner. Doing this in a single adjustment, however, has in the past proven to be impractical because prior adjustment solutions were highly optimized for just one type of data (e.g., optimization for bundle adjustment versus registration versus total station adjustments). Hence, it was understood that it is attractive to adjust each type of data separately and combine the results afterward (with blunders and/or outliers removed). This technique is related to federated filtering.

For both photogrammetry and 3D laser scan data, the primary adjustment output is the 6D pose for each instrument (e.g., 3 position and 3 orientation values for the camera(s) and for the scanner). The secondary output is a 6 by 6 covariance matrix for pose error estimation. The adjustment results from these two data types can be combined afterward because they are basically the same. For total stations, the primary adjustment output is the 3D position of the surveying instrument and foresights and sometimes backsights along with 3 by 3 covariance matrices for these positions. In other words, the outputs being solved for (also known as the degrees of freedom) in a total station adjustment are very different from those of a photogrammetry or a point cloud adjustment.

A prior solution, instead of trying to overcome this incompatibility, uses a 6 or 7-parameter rigid body transformation to fit the photogrammetry and/or point cloud adjustments to the instrument positions that were determined by the total station adjustment. Theoretically speaking, this is non-optimal because there are typically very few total station observations but many photogrammetry and/or point cloud observations. In other words, this prior solution allows the majority of data to be ruled by the minority of the data from the survey instrument. It may work in cases because the total station instruments are of high quality and users are very careful when they use the total station instruments to produce observations with minimal error.

In contrast, the overall adjustment method described herein provides a process where photogrammetry and/or point cloud adjustment results can be included with the total station adjustment. This is an optimal solution because it uses all available observations from the survey instrument in the adjustment, which will likely produce a more accurate solution even when using lower quality data (e.g., from a lower quality total station instrument or from a less experienced or careful surveyor).

FIG. 1 illustrates a system or network 100 adapted for implementing the method of performing a single "overall" or "grand" adjustment of data collected by a survey instrument that functions as a total station and also gathers images/photographs and a 3D scan (or point cloud) of a site or physical environment being surveyed by a surveyor. As shown, the system 100 includes a surveying instrument (or hardware and software) 110 that is operable by an operator/surveyor (not shown in FIG. 1 but understood to operate/use the instrument 110) to survey a physical environment or site 105. In field use, the surveying instrument 110 is positioned in or near a physical environment or site 105 (e.g., a site that is being surveyed).

The device 110 includes a processor(s) 112 managing operations (e.g., with software) of input and output (I/O) devices 114 that allow the instrument 110 to communicate data (e.g., in a wireless (or wired) manner) over a communications network 140 to a data analysis server 150 as shown with arrow 138. The processor 112 also manages data storage and retrieval in memory or data storage 130 (e.g., any type of computer-readable media). Further, the processor 152 manages operation (e.g., with additional operating systems and/or software packages) of a total station assembly 120, one or more digital cameras 122, and one or more scanners 124 (e.g., a 3D laser scanner). In one useful, but not limiting example, the surveying instrument 110 takes the form of a Trimble VX Station available from Trimble Navigation Limited (or a model available after the filing of this application, which may be a robotic total station with scanning and Trimble Vision or other camera technology) or similar surveying equipment.

As shown, the total station assembly 120 operates to gather as shown with arrow 121 a set of total station data that is stored in memory 130 by the processor 112 as shown at 132, and the total station data 132 may include vertical and horizontal angles and slope distances (e.g., 3 measurements) that are taken at each position or point along a traverse of the site 105 performed by a surveyor or other operator of the instrument 110. Concurrently, at each position/point of a traverse or other surveying process, the camera(s) 122 is operated by the processor 112 to gather digital images/photographs as shown at 123, and this image data 134 is stored in memory 130 by the processor 112. Likewise, the scanner 124 is also operated at each position/point of the traverse or other surveying process to gather scan data or a point cloud, and the scan data 136 is stored by the processor 112 in the instrument's memory 130. This collection of surveying data is then transferred by the I/O devices 114 to the data analysis or central server 150 over the network 140 as shown with arrow 138 for further processing including the overall adjustment described herein.

To this end, the data analysis server 150 includes a processor(s) 152 that manages memory/data storage 180 generally to create a geodatabase 182 for the site 105 based on all the data 132, 134, 136 collected by the surveying instrument 110 via operation, respectively, of the total station assembly 120, the camera(s) 122, and the scanner 124. As discussed below, the geodatabase 182 is processed so as to include the observations with a final network adjustment as shown at 184. This is achieved with the processor 152 executing code or software to provide an overall (or "grand") adjustment program 160 that integrates cloud scans, photographs, and total station data into one adjustment process (e.g., see the method or algorithm 200 of FIG. 2).

Figure 3:
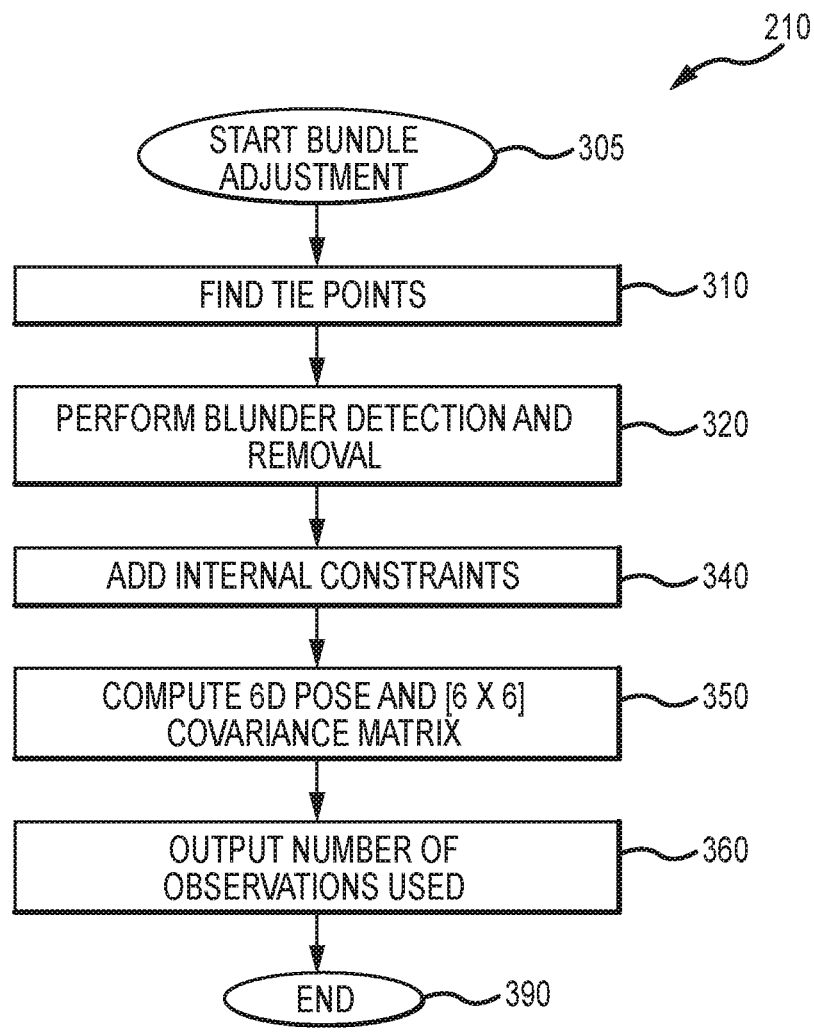
FIG. 3 is a flow diagram or chart of the photogrammetry bundle adjustment as may be performed as part of the overall or grand adjustment to the surveying data provided in FIG. 2.
Figure 4:
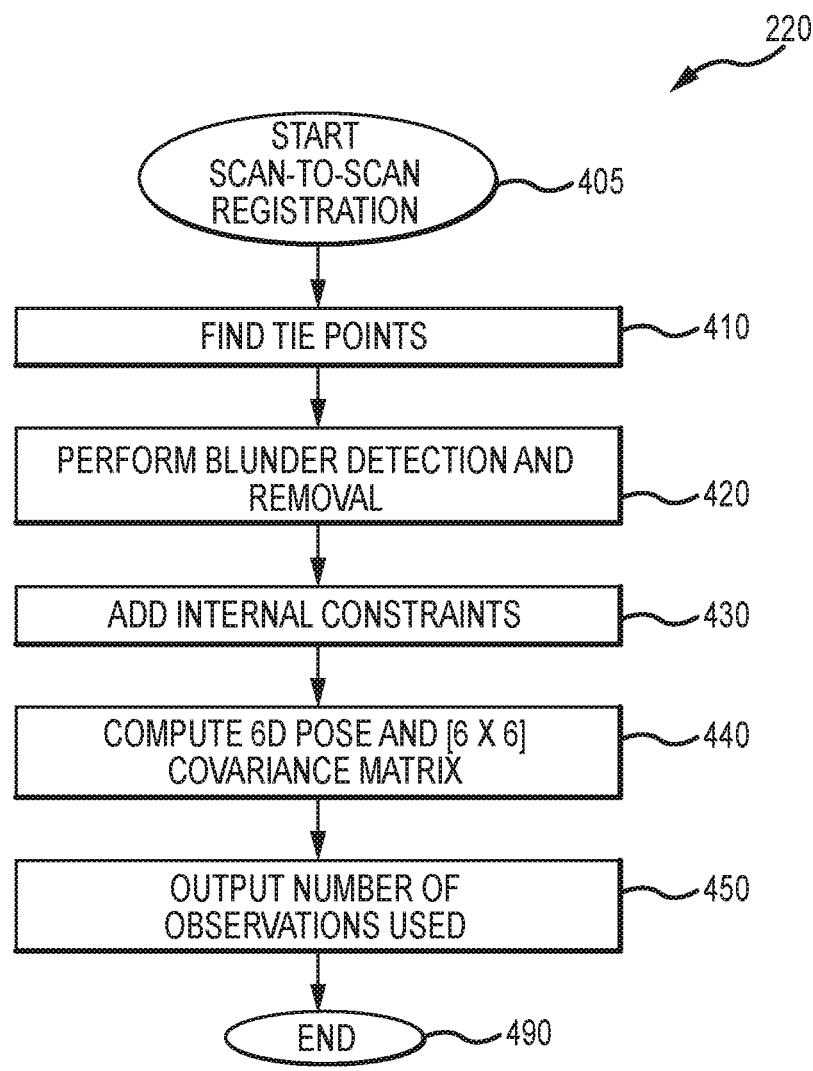
FIG. 4 is a flow diagram or chart of the scan data adjustment (e.g., registration) as may be performed as part of the overall or grand adjustment to the surveying data shown in FIG. 2.

Based on the data transfer 138 from the surveying instrument 110, the processor 152 stores in memory 180 the total station observations 190, the received image data 192, and the received scan data (or point cloud) 194. The overall adjustment program 160 includes or calls a photogrammetry bundle adjustment module 162 that performs a bundle adjustment (e.g., as shown in the algorithm of FIG. 3) on the received image data 192 from the camera(s) 122, and generates a photogrammetry bundle adjustment output 193 that the processor 152 stores in memory 180. The overall adjustment program 160 also includes or calls a scan registration module 164 that makes a separate adjustment on the received scan data 194 (as shown in the algorithm of FIG. 4 with a scan-to-scan registration) to produce scan registration output 195 stored in memory 180 by the processor 152.

Further, the overall adjustment program 160 includes a module 166 that is configured to generate (e.g., using the algorithm shown in FIG. 5) a set of virtual observations from the photogrammetry data 192 and/or output 193, and these are stored in memory 180 as shown at 196 by the processor 152. Likewise, the overall adjustment program 160 includes a module or subroutine 168 that is configured (e.g., using the algorithm shown in FIG. 6) to generate a set of virtual observations from the scan data 194 and/or the scan registration output 195, and these are stored in memory 180 as shown at 197 by the processor 152.

Still further, and significantly, the overall adjustment program 160 includes a weighting module/routine 170 that is run by the processor 152 to generate weights 198 that are assigned by the program 160 to each of the virtual observations 196, 197 to allow proper adjustment (such as with a least squares adjustment) of the integrated scan data, image data, and the total station data. The overall adjustment program 160 includes a network adjustment module 174 that takes the real observations 190 from the total station 120 along with the virtual observations 196 and 197 from the photogrammetry and point cloud (along with the weights 198) and performs a single network adjustment whose results are reflected in the geodatabase 182 as shown at 184.

To summarize representative operations of the system 100, the observations from each data type (images, point clouds, and total station) except one (e.g., the total station data) are adjusted separately in a manner consistent with existing algorithms for the data type. The results are then distilled down to a set of virtual observations that represent the essence of that particular adjustment. The virtual observations are all created in a manner that allows them to coexist (e.g., be compatible) with the remaining/target data type (e.g., the total station data) in the final adjustment process. The weighting of these virtual observations is calculated from the error estimates produced by the separate adjustments. These observation weights are then scaled according to the number of observations used in the separate adjustment and according to the number of virtual observations that were created.

The virtual observations generated and used in the system 100 are of two types: (1) a direct observation of station pose (6 values), which is accompanied by a 6×6 covariance matrix per station; and (2) indirect observations of real or synthetically chosen 3D positions, which are accompanied by error estimates of horizontal angle, vertical angle, and slope distance. The choice of which virtual observation type is created depends on the target data type mentioned above. If the target data type is photogrammetry and/or point cloud data, then virtual observations of the first type should be used. If the target data type is total station data (as is the case in the following examples), the second type of virtual observations should be used, and it is likely that this second type of virtual observations will be used in most surveying system. In either case, the method/algorithms act to create virtual observations to allow the adjustments of the various data types to be combined.

Figure 2:
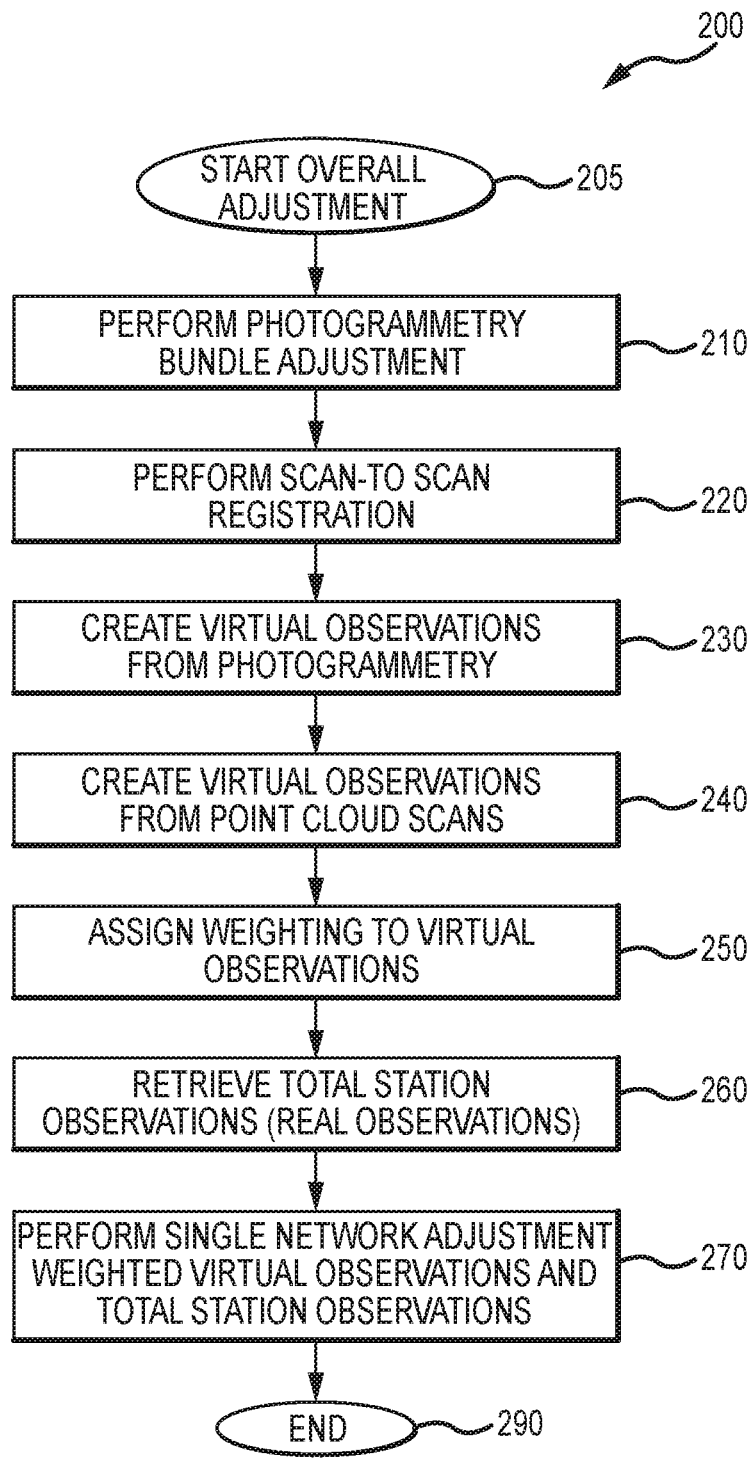
FIG. 2 is a flow diagram or chart of a method of integrating image, scan, and total station data into a single network adjustment.

FIG. 2 illustrates an overall adjustment method 200 as may be carried out by operations of the system 100 of FIG. 1 (e.g., by the server 150 running the overall adjustment program 160) to process data from survey instrument 110. The method 200 starts at 205 such as with receiving a data transfer as shown at 138 in FIG. 1 from a surveying instrument 110 of instrument data that would include total station observations 190, image data (digital images/photographs) 192, and scan or point cloud data 194. Step 205 may also include installing and initiating execution of an overall adjustment program as shown at 160 on a central server (e.g., server 150).

The method 200 is performed under the base assumption that photogrammetry, point cloud scans, and total station data are to be combined into a single adjustment of total station data (the target type). This means that the photogrammetry and point cloud data types will be adjusted in the method 200 separately and then distilled down to virtual observations of the second type discussed above, which will be used in an adjustment with total station data. Total station observations are polar by nature, which means there is a horizontal angle, a vertical angle, and a slope distance from the station to a point that has been measured. There are standard error estimates for the two angles, the slope distance, and the pose of the station. The observations from a total station, therefore, do not need to be converted into this second type of virtual observations (as part of the method 200) because they are already in the form needed or desired for use in the final adjustment (e.g., step 270 of method 200 in FIG. 2).

The first two steps 210 and 220 of the method 200 involve performing separate adjustments, respectively, of the photogrammetry data and the point cloud data. FIG. 3 illustrates the step 210 of performing a photogrammetry bundle adjustment, which may use or be based on any number of existing (or to be developed) software packages or algorithms for performing bundle adjustments on image data from cameras of a surveying instrument. In general, for the photogrammetry data, the adjustment 210 which starts at 305 (such as with a call from the main adjustment program or method 200) involves extracting photogrammetric tie point observations from the images at step 310.

At step 320, the adjustment (which is often known as a bundle adjustment) involves performing blunder detection and removal of these blunders or outliers in the observations. Step 340 is next performed to add internal constraints (e.g., 7 constraints in some embodiments) to allow the bundle adjustment to properly compute (e.g., assure that the covariance matrix is invertible). Next, at step 350, a bundle adjustment is performed that produces a 6D pose and a [6×6] covariance matrix. The adjustment 210 continues at 360 with outputting the number of observations used (e.g., row and column coordinates on an image) to facilitate later weighting calculations (see step 250 in FIG. 2). The photogrammetry adjustment process 210 then ends at 360 (e.g., with a return to the main adjustment 200 of FIG. 2).

FIG. 4 illustrates the step 220 of performing a registration or separate adjustment of the data from the scanner of the surveying instrument. As with the adjustment of the photogrammetry data, the registration (e.g., scan-to-scan registration) 220 may take the form of and/or build upon any number of existing (or to be developed) software packages or algorithms for performing registration of scan or point cloud data. The registration starts at 405 such as via a call to a registration module/routine from the main adjustment program/method 200. For the point cloud data and its adjustment 220, observations from two or more instrument positions that are to the same physical objects (e.g., the equivalent of tie points in photogrammetry) are found at step 410.

The adjustment/registration 220 continues at 420 with performing blunder detection and removal to get rid of outliers in the point cloud data. At step 430, internal constraints (e.g., 6 internal constraints) are added to allow the adjustment to compute (e.g., to again assure that the generated matrix is invertible). At step 440, the registration/adjustment of the point cloud data is performed with a 6D pose and a [6×6] covariance matrix being computed. At 450, the registration/adjustment 220 continues with outputting the number of observations used to facilitate weighting calculations (see step 250 in FIG. 2). The registration/scan data adjustment 220 then ends at 490 such as with a return to the method 200 or main adjustment program for further processing/steps. Note, steps 210 and 220 may be performed in any order.

Figure 5:
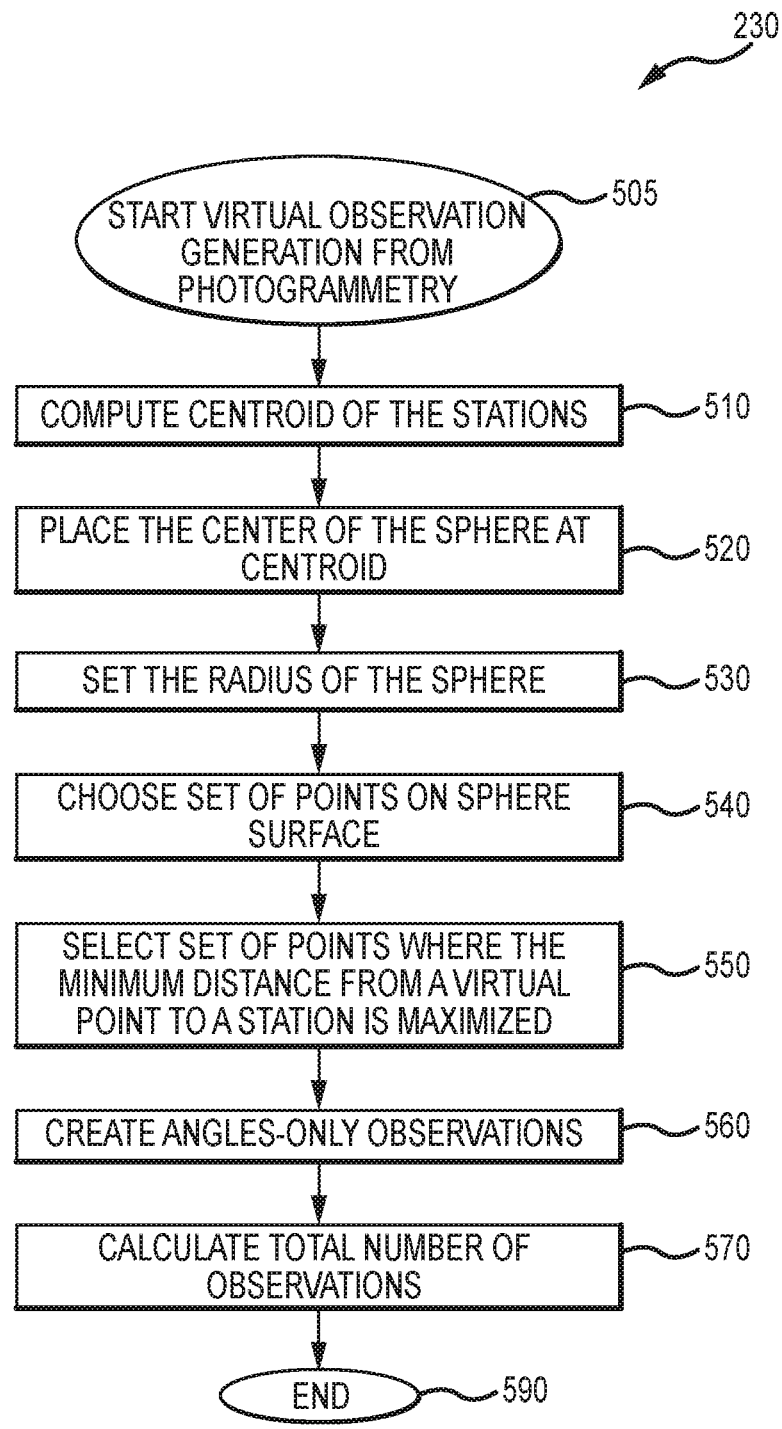
FIG. 5 is a flow diagram or chart of the process or step of generating virtual observations from the photogrammetry data as may be performed as part of the overall or grand adjustment of FIG. 2.

Returning to the main adjustment method 200 of FIG. 2, the method 200 continues with steps 230 and 240, which involve creating virtual observations or providing the distilling process of the adjustment 200 for the two data types being integrated with the total station data. FIG. 5 illustrates in more detail the process 230 of creating virtual observation for photogrammetry (and, as with steps 210 and 220 steps 230 and 240 can be performed in either order (or the order may also be 210, 230, 220, 240 or 220, 240, 210, 230)). The virtual observation generation 230 begins at 605 such as with the overall adjustment method 200 calling a routine/module to create the virtual observations.

The photogrammetry distilling method/step 230 includes a step 510 of computing the centroid of the stations (e.g., camera positions when the image data was captured) and then placing the center of a sphere at this computed centroid with step 520 (note, this is optional but facilitates computations). Then, at 530, the method 230 continues with setting the radius of the sphere. In some embodiments, the radius is set to be the maximum distance from the centroid to any of the stations.

At step 540, the method 230 continues with choosing a set of virtual points on the sphere surface. The set of virtual points may have "n" members (e.g., a set of four or more virtual points), and these virtual points may be chosen to be nearly equidistant (or equidistant if possible) from each other, e.g., be corners of a triangle, a cube, or other shape. Further, the virtual points may be chosen so as to be at a maximum distance from each other. The method 230 continues at 550 with selection of a number of the virtual points from the set defined in step 540 where the minimum distance from a virtual point to a station is maximized. Then, at step 560, the method 230 continues with creating angles-only virtual observations (e.g., horizontal and vertical angles) or 2D observations. At step 570, the total number of observations is calculated (e.g., assuming there are "m" stations then the total number of observations is m*n), and the method 230 ends at 590 (such as with returning control to the main adjustment program 200 of FIG. 2).

Figure 6:
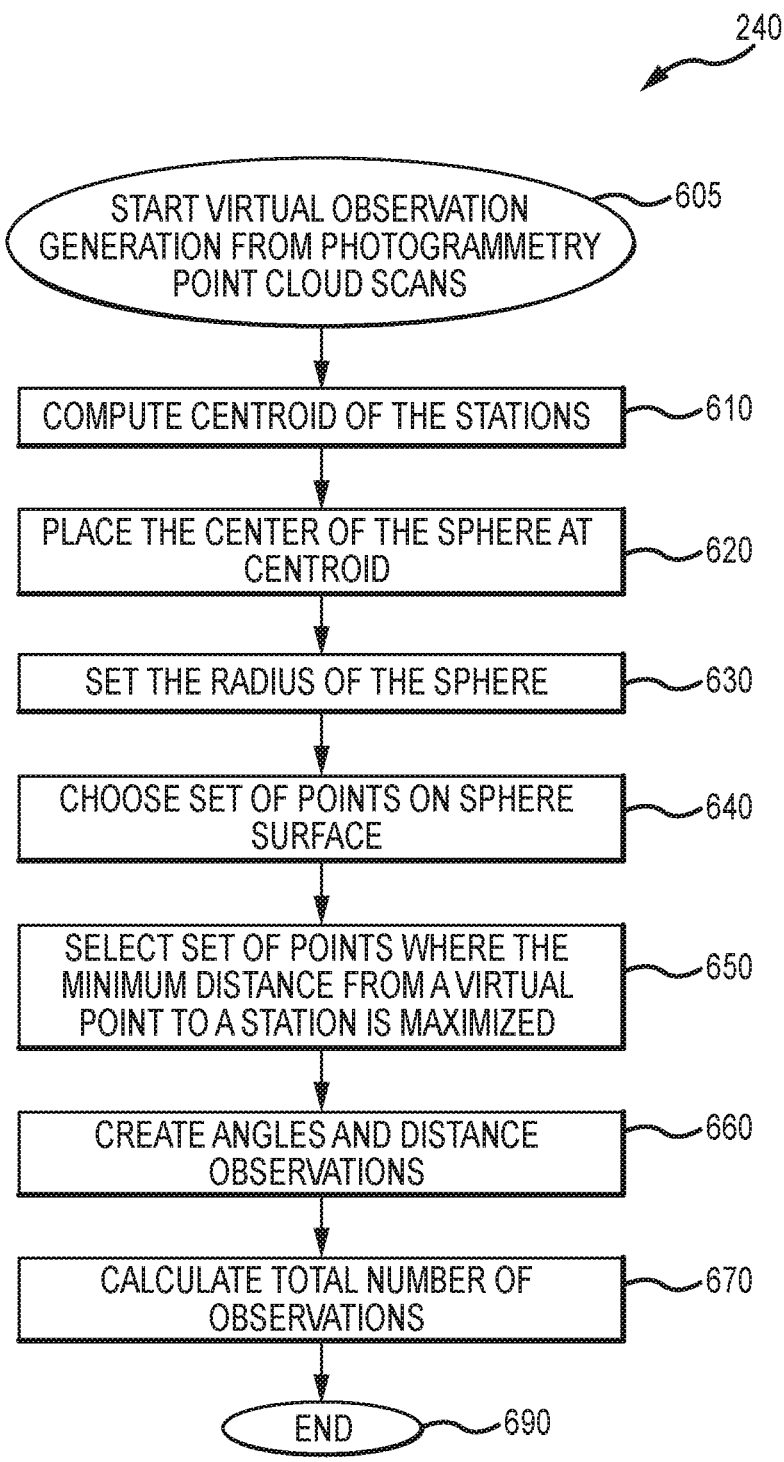
FIG. 6 is a flow diagram or chart of the process or step of generating virtual observations from the point cloud scans or scan data as part of the overall or grand adjustment shown in FIG. 2.

Next in method 200, step 240 involves creating virtual observations from point cloud scans 240, with the step/method 240 shown in more detail in FIG. 6 and starting at 605 such as with a call from the overall or grand adjustment method 200 of FIG. 2. Although point cloud observations are already polar, the second type of virtual observations described above cannot be directly created because it cannot be guaranteed that point cloud observations from two or more stations are to the same physical point. This is because scanner data can interleave. As a result, point cloud adjustments typically try to make collections (or regions of points) from different stations agree or align with each other (e.g., a section of a wall). When a point cloud adjustment is done, the pose of each station is adjusted so as to minimize the disagreement between these regions or collections. These poses should also have an error estimate or covariance matrix associated with each instrument position.

The method 240 as shown in FIG. 6 is similar to the step/method 230 and begins with computing a centroid of the stations at 610 followed by (optionally) placing the center of the sphere at the centroid in step 620. The method 240 continues at 630 with setting the radius of the sphere, e.g., to be the maximum distance from the centroid to any station. Next, at 640, the method 240 includes choosing a set of points on the sphere surface and then at 650 selecting a set of the points where the minimum distance from a virtual point to a station is maximized. Next, in step 660, the angles and distance observations are created, e.g., 3D observations defined by a horizontal angle, a vertical angle, and a slope distance. The total number of observations are calculated in step 670, and the method 240 ends at 690 (e.g., with a return to the overall adjustment method 200 of FIG. 2).

As can be seen in performing the step 240 in FIG. 6, the creation of virtual observations begins by choosing the quantity and location of synthetically generated 3D positions—virtual points. These positions can coincide with the regions used in the adjustment but can also be chosen synthetically to give a uniform distribution and reasonably strong geometry. For synthetically generated positions, it may be useful to proceed as follows: (a) choose 6 points (e.g., 5 to 8 or more points) arranged equidistantly on the surface of the sphere; (b) adjust so that the center of the sphere coincides with the centroid of the surveying instrument positions; (c) set the radius of the sphere to equal the average distance from the centroid to the surveying instrument positions; and (d) adjust the orientation of the sphere to roughly maximize the distance between any one of the 6 points and the nearest surveying instrument position.

In this way (performance of steps 210-240 in overall adjustment method 200 of FIG. 2) for each 3D position, the virtual observations from each of the surveying instruments data-gathering elements (e.g., the total station, the scanner, and the cameras) can be represented in polar form. The covariance matrix for the station pose can be used to create error estimates for the two angles and slope distance of the virtual observation. To this end, the method 200 continues at step 250 with assigning a weight to each of the virtual observations (photogrammetry and point cloud data).

Assigning weighting at 250 may involve: (a) using the [6×6] covariance matrix for a station and the position of a virtual point to calculate the angular uncertainties and slope distance uncertainties so as to generate or provide a [3×3] covariance matrix for each 3D observation and a [2×2] covariance matrix for each 2D observation; and (b) scaling the weighting according to the ratio of the number of observations used (from steps 360 and 450) to the number of virtual observations created (from steps 450 and 570). Stated differently, this is P=number of real observations/number of virtual observations, and the covariance matrix for each virtual observation is divided by "P," which makes weighting greater (or "cranked up") when there are many observations being represented by the small number of virtual observations.

For example, if the suggested 6 points are used and there are 10 instrument positions, this would result in 60 virtual observations. A scale factor is then applied to the weighting of each virtual observation so as to make their weighting consistent with the number of point cloud observations used in the point cloud adjustment. For example, if the point cloud adjustment used 600,000 real observations and 60 virtual observations are created, the weighting of each virtual observation is scaled up by 600,000/60=10,000. This means that the error estimates would be reduced by a factor of SQRT(10,000)=100 because error estimates are inversely proportional to the square root of weight. A user-defined weighting scale factor could also be applied if the user wants to manually shift priority to one data type or another.

These virtual observations are then added to the final/ target in the method 200 with step 260 involving retrieving the total station observations (or real observations) while also using or retrieving all the photogrammetry observations (virtual observations) and point cloud observations (virtual observations). Then, at step 270, a single network adjustment (e.g., any conventional software or algorithms used with total station data may be used to perform this adjustment) is performed on the total station observations and virtual observations taking into account the weighting from step 260. The method 200 then ends at 290.

Note, the number of observations is greatly reduced as the process only uses the virtual observations created from the scan data and the image data and not all photogrammetry data and scanned points, which makes the network adjustment much less computationally expensive and/or much more practical to implement with existing and yet to be produced processors/computing systems. In this last step 270 of the overall adjustment algorithm 200, a final or target adjustment is performed. The native total station observations, the virtual observations from the point cloud adjustment, and the virtual observations from the bundle adjustment are all combined into one adjustment. When adjusted, the final point positions will be the result of all data types combined in a weighted manner.

If the surveying instrument is poorly calibrated (e.g., the scanner, total stations, and cameras are not in tight agreement), it may be useful to add unknowns for angle and/or position offsets between the data types and to then let the adjustment solve them. These unknowns are basically corrections for some of the calibration constants in the surveying instrument. Adding such unknowns causes the process 200 to be self-calibrating. Even when the surveying instrument is well calibrated, it may be useful to add these unknowns, but, often, there should be a direct observation of zero for each one with a weighting based on calibration error estimates.

While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

We claim:

1. A method for performing an integrated adjustment of data collected by a surveying instrument operable to gather differing data types, comprising:
storing in memory a set of total station observations for a physical site, image data for the site, and scan data for the site; and
with a processor, executing computer-executable code defining an overall adjustment to:
retrieve the total station observations, the image data, and the scan data;
perform a bundle adjustment of the image data;
after the bundle adjustment, generate a set of virtual observations from the image data;
perform a registration adjustment of the scan data;
after the registration adjustment, generate a set of virtual observations from the scan data; and
perform a single network adjustment on the total station observations, the virtual observations from the image data, and the virtual observations from the scan data, and
wherein the overall adjustment program further assigns, prior to the performing of the single network adjustment, weighting to the virtual observations from the image data and to the virtual observations from the image data from the scan data, and
wherein the weighting is based on a total number of observations in the image data and the scan data, respectively.

2. The method of claim 1, wherein the single network adjustment provides positions of the surveying instrument based on the set of total station observations, the image data, and scan data.

3. The method of claim 1, wherein the bundle adjustment comprises computing a six-dimensional (6D) pose and a covariance matrix based on the image data and the registration adjustment comprises computing a six-dimensional (6D) pose and a covariance matrix based on the scan data.

4. The method of claim 1, wherein the set of virtual observations from the scan data includes less than ten observations and wherein the set of virtual observations from the image data includes less than ten observations.

5. The method of claim 4, wherein the set of virtual observations from the scan data includes at least four observations and wherein the set of virtual observations from the image data includes at least four observations.

6. The method of claim 1, wherein the virtual observations in the set of virtual observations from the image data comprise angles-only observations and wherein the virtual observations in the set of virtual observations from the scan data comprise angles and distance observations.

7. The method of claim 1, wherein the virtual observations are generated by computing a centroid of stations for the surveying instrument during collection of the scan data and the image data, positioning a sphere relative to the centroid, and choosing a set of points on the surface of the sphere.

8. The method of claim 7, wherein the set of points are selected to maximize a minimum distance from each of the points to one of the stations.

9. A method for adjusting positional data gathered with a surveying instrument, comprising:
performing a photogrammetry bundle adjustment for image data for a site gathered by the surveying instrument positioned at a plurality of stations;
performing a scan-to-scan registration for point cloud data gathered by the surveying instrument positioned at the plurality of stations;
generating a first set of virtual observations using output of the photogrammetry bundle adjustment;
generating a second set of virtual observations using output of the scan-to-scan registration; and
performing a network adjustment on a combination of the first and second sets of virtual observations,
wherein the combination processed in the network adjustment further comprises total station observations obtained at the plurality of stations via operation of the surveying instrument, and
wherein the virtual observations are configured to have a data type compatible with the total station observations.

10. The method of claim 9, wherein the network adjustment comprises a least squares adjustment.

11. The method of claim 9, wherein the photogrammetry bundle adjustment comprises computing a six-dimensional (6D) pose and a covariance matrix based on the image data and the scan-to-scan registration comprises computing a six-dimensional (6D) pose and a covariance matrix based on the point cloud data.

12. The method of claim 9, further comprising assigning, prior to the performing of the network adjustment, weighting to the virtual observations from the image data and to the virtual observations from the image data from the scan data and wherein the weighting is calculated based on a total number of observations in the image data and the point cloud data, respectively.

13. The method of claim 9, wherein the first and second sets each include a number of observations in the range of 5 to 9.

14. The method of claim 9, wherein the virtual observations are generated by computing a centroid of the stations, positioning a sphere relative to the centroid, and choosing a set of points on the surface of the sphere and wherein the set of points are selected to maximize a minimum distance from each of the points to one of the stations.

15. A system for processing surveying data to enhance positional accuracy, comprising:
a surveying instrument including a total station, at least one camera, and a scanner, wherein the surveying instrument is operable to collect, at a plurality of stations, a set of total station observations with the total station, images with the at least one camera, and scan data with the scanner; and
a server providing an overall adjustment module that functions to:
generate a first set of virtual observations from the image data;
generate a second set of virtual observations from the scan data;
weight the virtual observations in the first and second sets based on total numbers of observations in the image data and the scan data, respectfully; and perform an adjustment on a combination of the set of total station observations, the weighted first set of virtual observations from the image data, and the weighted second set of the virtual observations from the scan data.

16. The system of claim 15, wherein the overall adjustment module performs a bundle adjustment on the image data prior to the generating of the first set of virtual observations and wherein the overall adjustment module performs a scan-to-scan adjustment on the scan data prior to the generating of the second set of virtual observations.

17. The system of claim 15, wherein the total station observations and the virtual observations each include a 6D pose and a [6×6] covariance matrix.

18. A method for performing an integrated adjustment of data collected by a surveying instrument operable to gather differing data types, comprising:
storing in memory a set of total station observations for a physical site, image data for the site, and scan data for the site; and
with a processor, executing computer-executable code defining an overall adjustment to:
retrieve the total station observations, the image data, and the scan data;
perform a bundle adjustment of the image data;
after the bundle adjustment, generate a set of virtual observations from the image data;
perform a registration adjustment of the scan data;
after the registration adjustment, generate a set of virtual observations from the scan data; and
perform a single network adjustment on the total station observations, the virtual observations from the image data, and the virtual observations from the scan data,
wherein the set of virtual observations from the scan data includes less than ten observations, and
wherein the set of virtual observations from the image data includes less than ten observations.

19. The method of claim 18, wherein the single network adjustment provides positions of the surveying instrument based on the set of total station observations, the image data, and scan data.

20. The method of claim 18, wherein the bundle adjustment comprises computing a six-dimensional (6D) pose and a covariance matrix based on the image data and the registration adjustment comprises computing a six-dimensional (6D) pose and a covariance matrix based on the scan data.

21. The method of claim 18, wherein the set of virtual observations from the scan data includes at least four observations and wherein the set of virtual observations from the image data includes at least four observations.

22. The method of claim 18, wherein the virtual observations in the set of virtual observations from the image data comprise angles-only observations and wherein the virtual observations in the set of virtual observations from the scan data comprise angles and distance observations.

23. The method of claim 18, wherein the virtual observations are generated by computing a centroid of stations for the surveying instrument during collection of the scan data and the image data, positioning a sphere relative to the centroid, and choosing a set of points on the surface of the sphere and wherein the set of points are selected to maximize a minimum distance from each of the points to one of the stations.

24. A method for performing an integrated adjustment of data collected by a surveying instrument operable to gather differing data types, comprising:
storing in memory a set of total station observations for a physical site, image data for the site, and scan data for the site; and
with a processor, executing computer-executable code defining an overall adjustment to:
retrieve the total station observations, the image data, and the scan data;
perform a bundle adjustment of the image data;
after the bundle adjustment, generate a set of virtual observations from the image data;
perform a registration adjustment of the scan data;
after the registration adjustment, generate a set of virtual observations from the scan data; and
perform a single network adjustment on the total station observations, the virtual observations from the image data, and the virtual observations from the scan data, and
wherein the virtual observations in the set of virtual observations from the image data comprise angles-only observations, and
wherein the virtual observations in the set of virtual observations from the scan data comprise angles and distance observations.

25. The method of claim 24, wherein the single network adjustment provides positions of the surveying instrument based on the set of total station observations, the image data, and scan data.

26. The method of claim 24, wherein the bundle adjustment comprises computing a six-dimensional (6D) pose and a covariance matrix based on the image data and the registration adjustment comprises computing a six-dimensional (6D) pose and a covariance matrix based on the scan data.

27. The method of claim 24, wherein the virtual observations are generated by computing a centroid of stations for the surveying instrument during collection of the scan data and the image data, positioning a sphere relative to the centroid, and choosing a set of points on the surface of the sphere and wherein the set of points are selected to maximize a minimum distance from each of the points to one of the stations.

28. A method for performing an integrated adjustment of data collected by a surveying instrument operable to gather differing data types, comprising:
storing in memory a set of total station observations for a physical site, image data for the site, and scan data for the site; and
with a processor, executing computer-executable code defining an overall adjustment to:
retrieve the total station observations, the image data, and the scan data;
perform a bundle adjustment of the image data;
after the bundle adjustment, generate a set of virtual observations from the image data;
perform a registration adjustment of the scan data;
after the registration adjustment, generate a set of virtual observations from the scan data; and
perform a single network adjustment on the total station observations, the virtual observations from the image data, and the virtual observations from the scan data, and
wherein the virtual observations are generated by computing a centroid of stations for the surveying instrument during collection of the scan data and the image data, positioning a sphere relative to the centroid, and choosing a set of points on the surface of the sphere.

29. The method of claim 28, wherein the single network adjustment provides positions of the surveying instrument based on the set of total station observations, the image data, and scan data.

30. The method of claim 28, wherein the bundle adjustment comprises computing a six-dimensional (6D) pose and a covariance matrix based on the image data and the registration adjustment comprises computing a six-dimensional (6D) pose and a covariance matrix based on the scan data.

31. The method of claim 28, wherein the set of points are selected to maximize a minimum distance from each of the points to one of the stations.

32. A method for adjusting positional data gathered with a surveying instrument, comprising:
    performing a photogrammetry bundle adjustment for image data for a site gathered by the surveying instrument positioned at a plurality of stations;
    performing a scan-to-scan registration for point cloud data gathered by the surveying instrument positioned at the plurality of stations;
    generating a first set of virtual observations using output of the photogrammetry bundle adjustment;
    generating a second set of virtual observations using output of the scan-to-scan registration;
    performing a network adjustment on a combination of the first and second sets of virtual observations; and
    assigning, prior to the performing of the network adjustment, weighting to the virtual observations from the image data and to the virtual observations from the image data from the scan data, wherein the weighting is calculated based on a total number of observations in the image data and the point cloud data, respectively.

33. The method of claim 32, wherein the network adjustment comprises a least squares adjustment.

34. The method of claim 32, wherein the photogrammetry bundle adjustment comprises computing a six-dimensional (6D) pose and a covariance matrix based on the image data and the scan-to-scan registration comprises computing a six-dimensional (6D) pose and a covariance matrix based on the point cloud data.

35. The method of claim 32, wherein the first and second sets each include a number of observations in the range of 5 to 9.

36. The method of claim 32, wherein the virtual observations are generated by computing a centroid of the stations, positioning a sphere relative to the centroid, and choosing a set of points on the surface of the sphere and wherein the set of points are selected to maximize a minimum distance from each of the points to one of the stations.

* * * * *